US010915109B2

(12) United States Patent
Telpaz et al.

(10) Patent No.: US 10,915,109 B2
(45) Date of Patent: Feb. 9, 2021

(54) CONTROL OF AUTONOMOUS VEHICLE BASED ON PRE-LEARNED PASSENGER AND ENVIRONMENT AWARE DRIVING STYLE PROFILE

(71) Applicant: GM Global Technology Operations LLC, Detroit, MI (US)

(72) Inventors: Ariel Telpaz, Givat Haim Meuhad (IL); Gila Kamhi, Zichron Yaakov (IL); Asaf Degani, Tel Aviv (IL)

(73) Assignee: GM Global Technology Operations LLC, Detroit, MI (US)

(*) Notice: Subject to any disclaimer, the term of this patent is extended or adjusted under 35 U.S.C. 154(b) by 191 days.

(21) Appl. No.: 16/248,214

(22) Filed: Jan. 15, 2019

(65) Prior Publication Data
US 2020/0225676 A1 Jul. 16, 2020

(51) Int. Cl.
*G05D 1/02* (2020.01)
*B60W 40/09* (2012.01)
*G06N 20/00* (2019.01)
*B60W 50/00* (2006.01)
*G05D 1/00* (2006.01)

(52) U.S. Cl.
CPC ........... *G05D 1/0221* (2013.01); *B60W 40/09* (2013.01); *B60W 50/0098* (2013.01); *G05D 1/0088* (2013.01); *G06N 20/00* (2019.01); *B60W 2520/105* (2013.01); *B60W 2554/00* (2020.02); *G05D 2201/0213* (2013.01)

(58) Field of Classification Search
CPC ... G05D 1/0221; G05D 1/0088; B60W 40/08; B60W 40/09; B60W 50/0098
See application file for complete search history.

(56) References Cited

U.S. PATENT DOCUMENTS

| | | | |
|---|---|---|---|
| 10,019,011 B1* | 7/2018 | Green | B60W 30/0953 |
| 10,254,759 B1* | 4/2019 | Faust | G05D 1/0088 |
| 10,431,023 B1* | 10/2019 | Watson | G01M 17/007 |
| 2019/0164007 A1* | 5/2019 | Liu | G06K 9/0063 |
| 2019/0318267 A1* | 10/2019 | Zhang | G06F 30/20 |
| 2020/0130703 A1* | 4/2020 | Pendelton | G06K 9/00302 |
| 2020/0174490 A1* | 6/2020 | Ogale | G05D 1/0231 |
| 2020/0216094 A1* | 7/2020 | Zhu | G06N 20/00 |
| 2020/0225668 A1* | 7/2020 | Masuda | G05D 1/0088 |
| 2020/0247432 A1* | 8/2020 | Misra | B60W 60/0015 |

* cited by examiner

*Primary Examiner* — Thomas G Black
*Assistant Examiner* — Sara J Lewandroski
(74) *Attorney, Agent, or Firm* — Quinn IP Law

(57) ABSTRACT

A method for controlling a vehicle includes collecting data about human driving styles; machine learning how the human driver reacts to different traffic scenarios based on the collected data to create a plurality of human driving styles profiles; selecting an optimal driving profile of the plurality of human driving styles profiles, wherein the optimal driving profile is selected based feedback provided by a passenger of the vehicle, the feedback is indicative of a pleasantness of each of the plurality of human driving styles profiles; creating a driving plan based on the optimal driving profile; commanding the vehicle to execute the driving plan in a controlled environment to test the pleasantness of the optimal driving profile; and receiving a pleasantness rating from the passenger of the vehicle while the vehicle executes the driving plan.

16 Claims, 5 Drawing Sheets

CONTROL OF AUTONOMOUS VEHICLE BASED ON PRE-LEARNED PASSENGER AND ENVIRONMENT AWARE DRIVING STYLE PROFILE

INTRODUCTION

The present disclosure relates generally to autonomous vehicles. More specifically, aspects of this disclosure relate to the control of an autonomous vehicle based on pre-learned passenger and environment aware driving style profile.

An autonomous vehicle is a vehicle that is capable of sensing its environment and navigating with little or no user input. An autonomous vehicle senses its environment using sensing devices such as radar, lidar, image sensors, potentiometers, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

While autonomous vehicles offer many potential advantages over traditional vehicles, in certain circumstances it may be desirable to improve the movement of autonomous vehicles, for example to better approximate human driving style. Accordingly, it is desirable to provide systems and methods for approximating human driving style in autonomous vehicles. Furthermore, other desirable features and characteristics of the present disclosure will become apparent from the subsequent detailed description and the appended claims, taken in conjunction with the accompanying drawings and the foregoing technical field and background.

SUMMARY

Passengers in self-driving cars often sense that the driving is too "robotic" (e.g., abrupt actions), and a human drive would have been more sensitive to ride comfort and smoothness. The present disclosure describes an automated method to calibrate an autonomous vehicle driving stumble to be more comfortable and sensitive to passengers based on analytical examination of how human drivers are driving. The present disclosure describes an offline machine learning algorithm that learns from day-to-day human driving data labeled with passenger feedback on comfort. The optimal driving style is determined with additional controlled experiments in which passengers will provide pleasantness scoring for each of the driving style, while encountering different road situations. The wining driving style will be leveraged as real time reference to the autonomous vehicle control and motion planning module.

The present disclosure describes an automatic process for learning the human driving autonomous comfort purposes through comfort labeled naturalistic data, and the evaluation and correction of the driving style algorithm by comparing a good "passenger and environment sensitive" human driving learned through controlled study data. Integration of reference of passenger and environment aware profile into controlled and motion planning modules.

A method for controlling a vehicle includes collecting data about human driving styles while a human driver drives the vehicle; machine learning how the human driver reacts to different traffic scenarios based on the collected data to create a plurality of human driving styles profiles; selecting, via a controller, an optimal driving profile of the plurality of human driving styles profiles, wherein the optimal driving profile is selected based on feedback provided by a passenger of the vehicle, the feedback is indicative of a pleasantness of each of the plurality of human driving styles profiles, and a human driving style profile of the plurality of human driving styles profiles rated with a highest pleasantness by the passenger of the vehicle selected as the optimal driving profile; creating a driving plan based on the optimal driving profile; commanding, via the controller, the vehicle to execute the driving plan in a controlled environment to test the pleasantness of the optimal driving profile; receiving, by the controller, a pleasantness rating from the passenger of the vehicle while the vehicle executes the driving plan. The method may further include comparing the pleasantness rating received from the passenger of the vehicle with a predetermined threshold. The method may further include: determining that the pleasantness rating received from the passenger is less than the predetermined threshold; and in response to determining that the pleasantness rating is less than the predetermined threshold, machine learning again how the human driver reacts to the different traffic scenarios based on the collected data.

The method may further include determining that the pleasantness rating received from the passenger of the vehicle is equal to or greater than the predetermined threshold; and ending the method in response to determining that the pleasantness rating received from the passenger of the vehicle is equal to or greater than the predetermined threshold. Collecting data about human driving styles may include collecting variables data, wherein the variables data includes acceleration, road objects location, and road objects behavior. The data about human driving styles may be recordings relating to day-to-day human driving. The machine learning may be Deep Reinforcement Learning, Random Forest Learning, and Deep Neural Network Learning. Selecting the optimal driving profile may include investigating the plurality of human driving styles profiles outputted by the machine learning to select the optimal driving profile. The method may further include changing a parameter of a control and planning system of the vehicle to implement the driving plan. Commanding the vehicle to execute the driving plan in the controlled environment may include simulating random sets of traffic situations in the controlled environment. The controlled environment may be a racetrack.

In one aspect, one of the different traffic scenarios is a cut-in scenario. Collecting data about human driving styles while the human driver drives the vehicle may include collecting data about while the human driver drives during the cut-in scenario. Machine learning how the human driver reacts to different traffic scenarios based on the collected data to create the plurality of human driving styles profiles may include machine learning how the human driver reacts in the cut-in scenario. In the cut-in scenario, the vehicle is referred to as a first vehicle. The first vehicle is moving on a first lane and a second vehicle is moving on a second lane that is immediately adjacent the first lane. A dividing, dashed line separates the first lane from the second lane. The second vehicle moves from the second lane toward the first lane until the second vehicle is moving on the first lane and in front of the first vehicle. Collecting data about human driving styles while the human driver drives the vehicle may include collecting data about while the human driver drives during the cut-in scenario includes, using a sensor system, sensing: an absolute distance from the first vehicle to the second vehicle; a direction angle, wherein the direction angle is an angle of the first vehicle relative to the second vehicle; an actor relative velocity, wherein the actor relative velocity is a difference in velocity between the first vehicle and the second vehicle; an actor relative acceleration, wherein the actor relative acceleration is a difference in acceleration between the first vehicle and the second vehicle; and an actor orientation, wherein the actor orientation is a yaw rate of the first vehicle. The controller may receive input data from the sensor system that is indicative of absolute distance, the direction angle, the actor relative velocity, the actor relative acceleration, and the actor orientation. Machine learning how the human driver reacts in the cut-in scenario includes: sensing, using the sensor system, a lateral acceleration of the first vehicle and a longitudinal acceleration of the vehicle during the cut-in scenario; and learning associations between: (a) the absolute distance from the first vehicle to the second vehicle; direction angle; the actor relative velocity; the actor relative acceleration; and the actor orientation; and (b) the longitudinal acceleration and the lateral acceleration of the first vehicle.

An autonomous vehicle includes a plurality of sensor devices configured to sense observable conditions of an exterior environment of the autonomous vehicle and a control system in communication with the plurality of sensor devices. The control system is configured to control the autonomous vehicle. The control system includes a controller, and the controller is programmed to: collect data about human driving styles while a human driver drives the autonomous vehicle; machine learn how the human driver reacts to different traffic situations based on the collected data to create a plurality of human driving styles profiles; select an optimal driving profile of the plurality of human driving styles profiles, wherein the optimal driving profile is selected based on input received from a vehicle passenger in which the vehicle passenger provides feedback on a pleasantness of the plurality of human driving styles; create a driving plan based on the optimal driving profile; command the autonomous vehicle to execute the driving plan in a controlled environment; and receive a pleasantness rating from the vehicle passenger that rates a pleasantness of the driving plan being executed by the autonomous vehicle. The controller may be configured to compare the pleasantness rating received from the vehicle passenger with a predetermined threshold. The controller may be configured to: determine that the pleasantness rating received from the vehicle passenger is less than the predetermined threshold, and in response to determining that the pleasantness rating is less than the predetermined threshold, machine learn again how human drivers react to different road and traffic situations based on the collected data. The controller may be configured to: determine that the pleasantness rating received from the vehicle passenger is equal to or greater than the predetermined threshold, and in response to determining that the pleasantness rating received from the vehicle passenger is equal to or greater than the predetermined threshold, no more machine learning is conducted. The controller may be configured to collect variables data. The variables data includes acceleration, road objects location, and road objects behavior. The collected data about human driving styles are recordings relating to day-to-day human driving.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

BRIEF DESCRIPTION OF THE DRAWINGS

The present disclosure will hereinafter be described in conjunction with the following drawing figures, wherein like numerals denote like elements.

Figure 1:
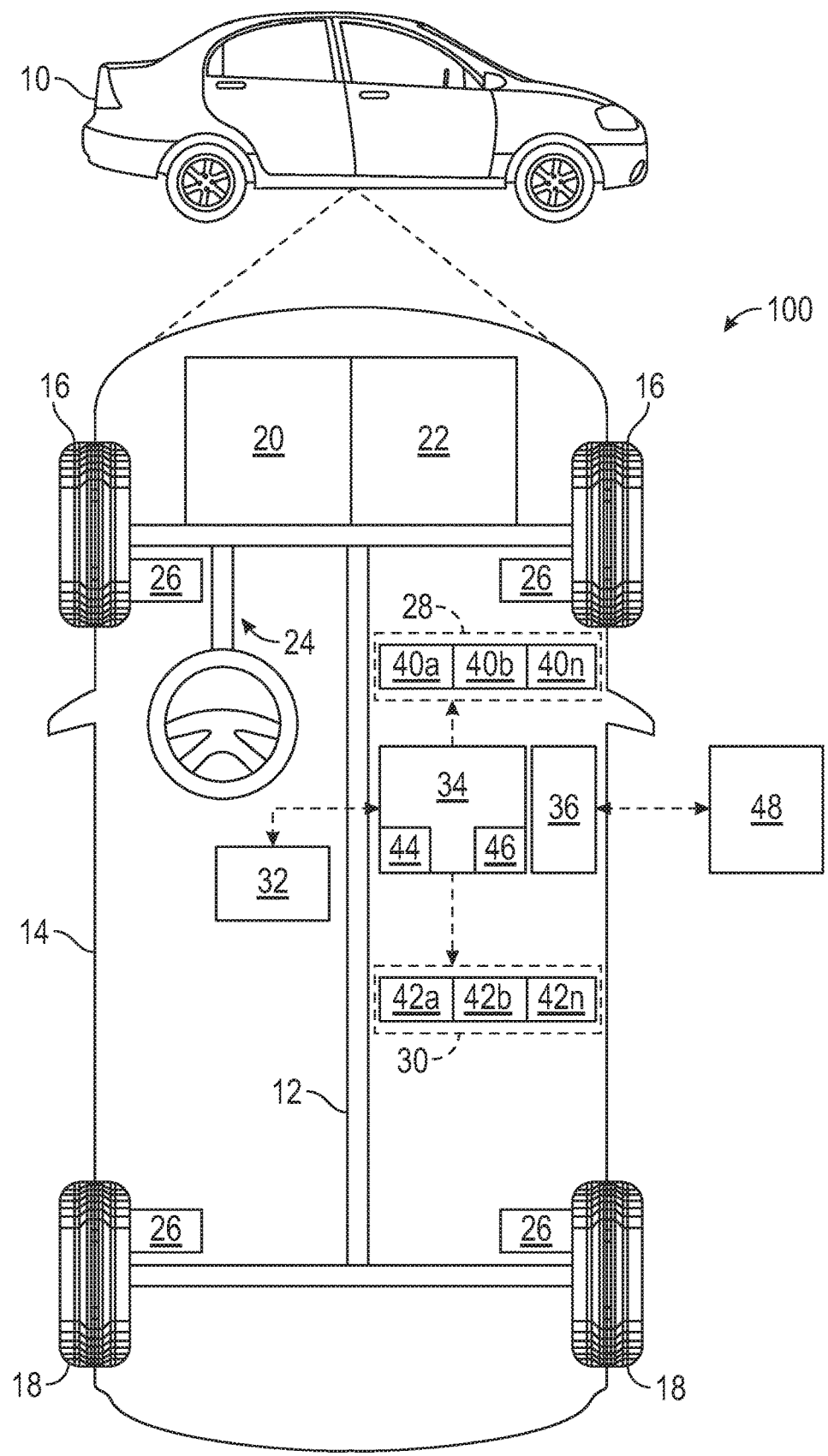
FIG. 1 is a functional block diagram illustrating an autonomous vehicle having a control system.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

The following detailed description is merely exemplary in nature and is not intended to limit the application and uses. Furthermore, there is no intention to be bound by expressed or implied theory presented in the preceding technical field, background, brief summary or the following detailed description. As used herein, the term module refers to hardware, software, firmware, electronic control component, processing logic, and/or processor device, individually or in a combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a control system shown generally at 100 is associated with a vehicle 10 in accordance with various embodiments. The vehicle 10 may be a fully autonomous vehicle, and the control system 100 is configured to control the operation and movement of the vehicle 10. The vehicle 10 may operate autonomously or may be operated (e.g., driven) manually by a human driver. In general, the control system 100 determines a motion plan for autonomously operating the vehicle 10 along a route in accordance with ride preference information associated with a vehicle occupant. In this regard, the ride preference information influences the rate at which the vehicle 10 moves laterally and/or longitudinally while traversing the route and avoiding obstacles, which, in turn influences the ride experienced by the occupant.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that other vehicles including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, accelerometers, inertial measurement units, potentiometers, clocks, odometers, gyroscopes, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features may further include interior and/or exterior vehicle features such as, doors, a trunk, and cabin features such as air, music, lighting, etc.

Figure 2:
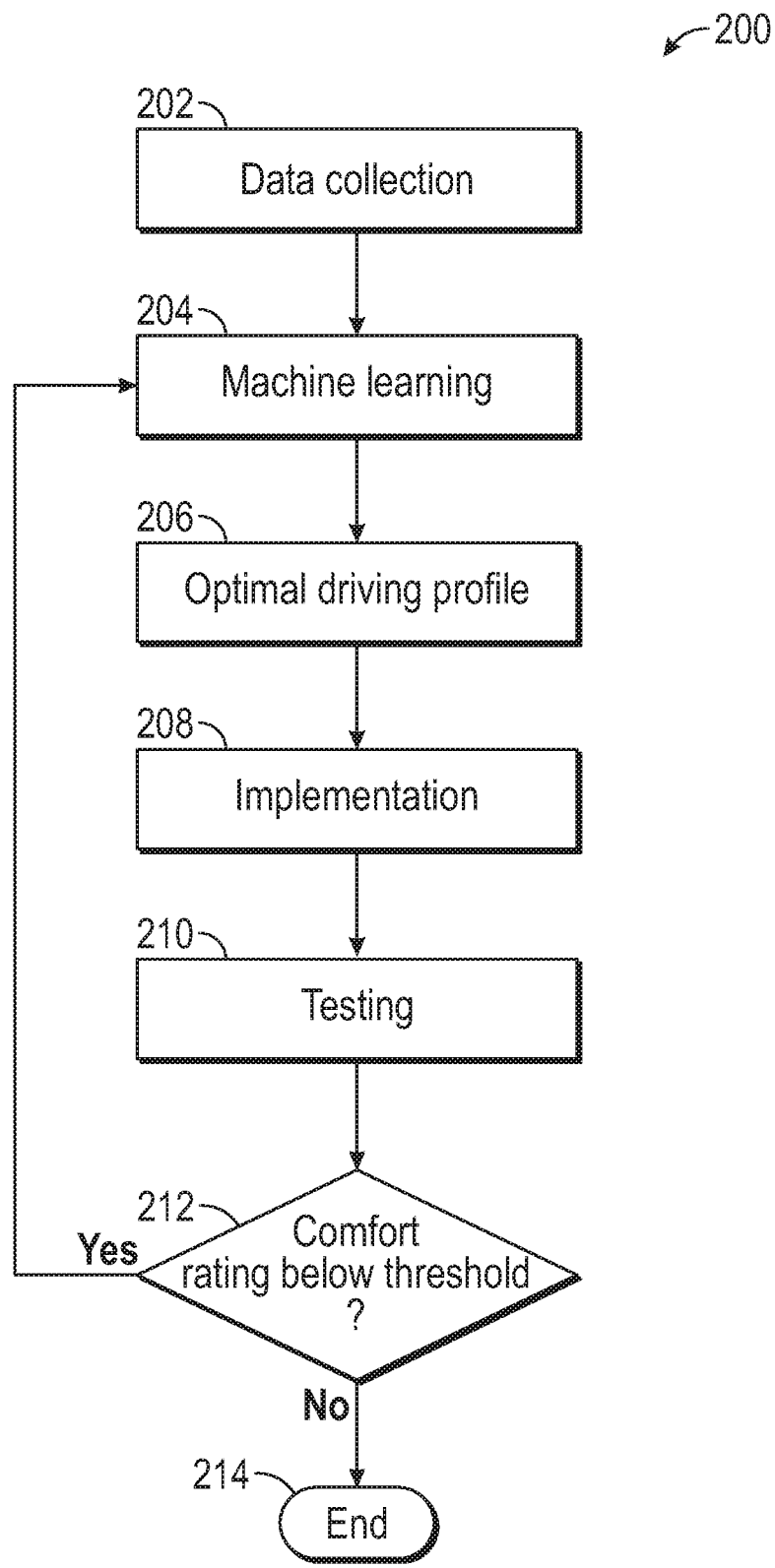
FIG. 2 is a flowchart of a method for controlling the autonomous vehicle of FIG. 1 based on pre-learned passenger and environment aware driving style profile.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system. The controller 34 may include an internal clock to measure time.

The controller 34 includes at least one processor 44 and a computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although solely one controller 34 is shown in FIG. 1, embodiments of the autonomous vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the autonomous vehicle 10. The controller 34 is specially programmed to execute the method 200 shown in FIG. 2.

FIG. 2 illustrates a flowchart of a method 200 for controlling the autonomous vehicle 10 based on pre-learned passenger and environmental aware driving style profile. The method 200 begins at block 202, which entails collecting data about human driving styles during different road and traffic scenarios. Specifically, the data about human driving styles are recordings relating to day-to-day human driver driving records data relating to naturalistic human day-to-day driving while a human driving drives the autonomous vehicle 10 or another vehicle. At block 202, by using the sensor system 28, the controller 34 records variables data sensed by the sensor system 28. The variables data may include information regarding the driving style of a human drive, such as acceleration, road objects location (e.g., other vehicles locations, traffic lights, road obstacles, lanes, exits etc.), road objects behavior (e.g., other vehicles behavior, traffic lights behavior, etc.), passenger feedback of the human driving style. The sensor system 28 may sense the human driving style by sensing, for example, the acceleration of the autonomous vehicle 10 (or another vehicle) using accelerometers and/or inertia measuring units of the sensor system. The sensor system 28 may also sense other data about the human driving style, such as velocity and jerk, by using other sensing devices 40a-40n, such as an odometer. The term "jerk" means the rate of change of the acceleration. In other words, the jerk is the time derivative of acceleration. The jerk may be determined by calculating the rate of change of the acceleration of the vehicle 10 (or another vehicle) using the clock of the sensing system 28 or the clock of the controller 34 and the accelerometer of the sensing system 28. Also, the sensor system 28 may sense environmental data around the autonomous vehicle 10 (or other vehicle) driven by a human using radars, lidars, global positioning systems, optical cameras, thermal cameras, ultrasonic sensors. At block 202, the controller 34 also collects data regarding the feedback from a passenger of the vehicle 10 (or other vehicle) that is being driven during the data collection process. To do so, this passenger may have a tablet (which may include a potentiometer) to rate the pleasantness of the driving style. The controller 34 then receives and stores the sensed information from the sensor system 28. During the data collection of block 202, a human solely drives the vehicle 10 (or another vehicle). In other words, no autonomous driving is performed during the data collection procedure of block 202. After block 202, the method 200 proceeds to block 204.

At block 204, the controller 34 (or another controller) uses a machine learning technique to learn how human drivers react to different road and traffic situations based on the data collected at block 202 to create a plurality of human driving styles profiles. Different machine learning techniques may be used at block 204, such as Deep Reinforcement Learning, Deep Neural Network Learning, and Random Forest Learning. By using the machine learning technique, the controller 34 creates several models of human driving style profiles in different road and traffic scenarios. Then, the method 200 proceeds to block 206.

At block 206, the controller 34 (or another controller) selects an optimal driving profile of the plurality of human driving styles profiles created at block 204 by conducting a study. The optimal driving profile is selected based on input received from a vehicle passenger in which the vehicle passenger provides feedback on a pleasantness of the plurality of human driving styles during a study. In the study, the human driving styles profiled created at block 204 (i.e., the automated learning output models) are investigated in selected vehicle maneuvers. During these vehicle maneuvers, a passenger of that vehicle (e.g., vehicle 10 or another vehicle) rates the pleasantness (i.e. comfort) of each of the plurality of human driving styles generated at block 204. In other words, the study entails an exploration of the most conformable driving style models in a fully controlled environment mimicking the human driving styles generated at block 204. To do so, the autonomous vehicle 10 is driven by the controller 34 in selected vehicle maneuvers, and, simultaneously, a passenger of the autonomous vehicle 10 uses an electronic tablet (including a potentiometer) to rate (or rank) the pleasantness (i.e., comfort) of each the plurality of human driving styles. The human driving style of the plurality of human driving style rated with the highest pleasantness (i.e., comfort) rating by the passenger is selected as the optimal driving profile. The optimal driving profile may be referred to as the passenger-environment aware driving style. Also, the controller 34 creates a driving plan based on the optimal driving profile. In other words, the controller 34 creates a driving plan that is consistent with the optimal driving profile. Next, the method 200 proceeds to block 208.

At block 208, the controller 34 (or another controller) implements the optimal driving profile determined in block 206. To do so, the controller 34 changes the default control and planning parameters of a control and planning system (i.e., the control system 100) of the autonomous vehicle 10 to implement the driving plan consistent with the optimal driving profile determined in block 206. As discussed above, the control system 100 is configured to control the operation and movement of the autonomous vehicle 10. By changing the default control and planning parameters, the control system 100 is specially programmed to control the operation and movement of the autonomous vehicle 10 in accordance with the optimal driving profile to maximize the comfort to the vehicle passengers. After executing block 208, the method 200 proceeds to block 210.

At block 210, the control system 100 (which includes the controller 34) commands the autonomous vehicle 10 to execute the driving plan (which corresponds to the optimal driving profile) in a controlled environment (e.g., racetrack) to test the pleasantness of the optimal driving profile. To do so, the control system 100 commands the autonomous vehicle 10 to simulate a random seat of traffic scenarios in a controller environment (e.g., a racetrack or proving grounds) and, simultaneously, a passenger of the autonomous vehicle 10 rates (with an electric table or other suitable input device) rates (or ranks) on how the autonomous vehicle 10 performs compared to a good human drive. In other words, the passenger of the autonomous vehicle 10 uses the electronic tablet (including a potentiometer) to rate (or rank) the pleasantness (i.e., comfort) of the driving plan that corresponds (and acts accordingly with the optimal driving plan). In other words, the controller 34 receives a pleasantness rating from the vehicle passenger of the autonomous vehicle 10 that rates the driving plan being executed by the autonomous vehicle 10. As a consequence, the controller 34 receives and stores the pleasantness (i.e., comfort) rating from the passenger of the autonomous vehicle 10. After block 210, the method 200 proceeds to block 212.

At block 212, the controller 34 compares the pleasantness (i.e., comfort) rating received from the passenger with a predetermined threshold. At this juncture, the controller 34 may determine that the pleasantness rating received from the vehicle passenger is less than the predetermined threshold. In response to determining that the pleasantness rating received from the vehicle passenger is less than the predetermined threshold, the method 200 returns to block 204, where the controller 34 machine learns again how human drivers react to different road and traffic situations based on the collected data. However, the controller 34 may alternatively determine that the pleasantness rating received from the vehicle passenger is equal to or greater than the predetermined threshold. In response to determining that the pleasantness rating received from the vehicle passenger is equal to or greater than the predetermined threshold, the controller 34 proceeds to block 214.

At block 214, the method 200 ends (e.g., no more machine learning is conducted). However, before ending the method 200, the controller 34 may command the autonomous vehicle 10 to execute the driving plan corresponding to the optimal driving profile in regular driving conditions. As a result, the autonomous vehicle 10 driven by the car buyers will execute the driving plan that corresponds to the optimal driving profile in order to maximize driving comfort.

Figure 3:
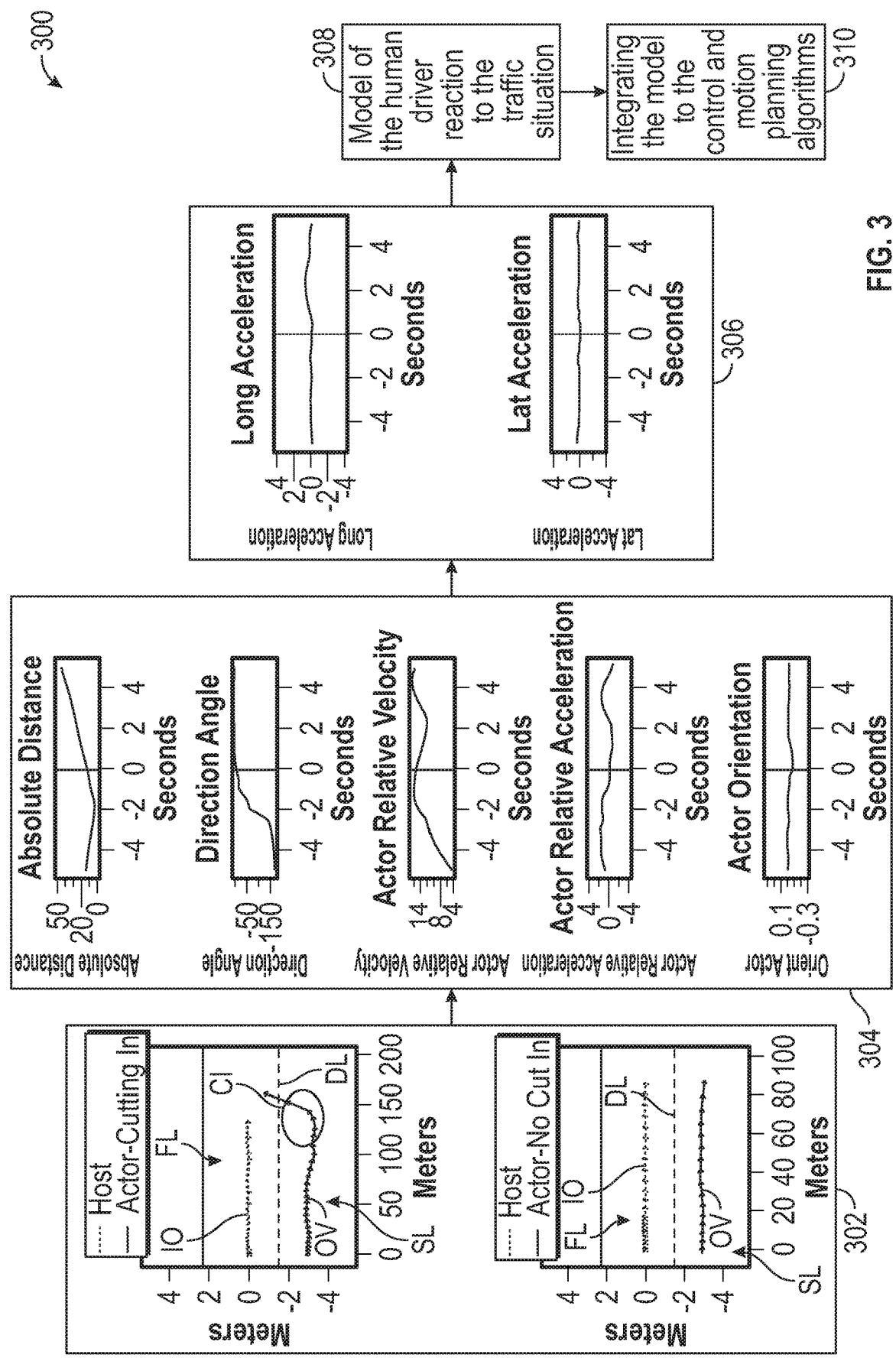
FIG. 3 is a flowchart of a method for controlling the autonomous vehicle of FIG. 1 based on pre-learned passenger and environment aware driving style profile during a cut-in scenario.

FIG. 3 illustrates an example 300 of the method 200. In this example 300, the controller 34 collects data on how human drivers identify and react to others vehicles cut-in scenario and a no-cut in scenario. This example 300 begins at block 302. At block 302, the controller 34 collects data on how the human driver of the vehicle 10 reacts when another vehicle OV cuts in, and data on how the human drive of the vehicle 10 reacts when another vehicle OV does not cut in. This traffic scenario is referred herein to as the cut-in scenario. In this cut-in scenario, the vehicle 10 is driving on a first lane FL, and the other vehicle OV is moving on a second lane SL that is immediately adjacent to the first lane FL. Further, in this cut-in scenario, the vehicle 10 may be referred to as the first vehicle or the host vehicle, and the other vehicle OV may be referred to as the second vehicle and/or the remote vehicle. The dividing, dashed line DL separates the first lane FL from the second lane SL. During the cut-in scenario, the other vehicle OV moves from the second lane SL toward the first lane FL until the other vehicle OV is moving on the first lane and in front of the vehicle 10. After block 302, the controller 34 executes block 304. As discussed above, at block 304, the sensor system 28 senses the appropriate data, such as: absolute distance from the autonomous vehicle 10 to the other vehicle OV; direction angle (defined as the angle of the vehicle 10 relative to the other vehicle OV); the actor relative velocity (defined as the difference in velocity between the vehicle 10 and the other vehicle OV); the actor relative acceleration (defined as the difference in acceleration between the vehicle 10 and the other vehicle); and the actor orientation (defined as the yaw rate of the vehicle 10). Then, the method proceeds to block 304. At block 304, to sense the absolute distance from the vehicle 10 to the other vehicle OV, the sensor system 28 senses may use one or more of the sensing devices 40a-40n, such as one or more lidars. To sense the direction angle, the sensor system 28 may use one or more of the sensing devices 40a-40n, such as one or more lidars and/or radars. To sense the actor relative velocity, the sensor system 28 may use one or more of the sensing devices 40a-40n, such as one or more odometers and/or lidars or radars. To sense the actor relative accelerator, the sensor system 28 may use one or more of the sensing devices 40a-40n, such as the accelerometers and/or odometers and a clock. To sense the actor orientation (i.e., yaw rate of the vehicle 10), the sensor system 28 may use one or more gyroscopes. The controller 34 is in electronic communication with the sensor system 28. Accordingly, at block 304, the controller 34 is programmed to receive input data from the sensor system 28, indicative of the absolute distance, the direction angle, the actor relative velocity, the actor relative acceleration, and/or the actor orientation. In the graphs shown in block 304, zero time is the moment in which the cut-in event occurs, which is labeled as CI in block 302. Blocks 302 and 304 are examples of block 202 (FIG. 2). After block 304, the controller 34 executes block 306.

At block 306, the controller 34 executes a machine learning technique (such as block 204 above) to learn associations between the input data of block 304 and the human driver actions by a professional driver during a cut-in scenario and a no cut-in scenario. To do so, at block 306, the controller 34 senses and learns the longitudinal acceleration (based on input from the sensory system 28) and the lateral accelerator (based on input from the sensor system 28) of the vehicle 10 during a cut-in scenario and a no cut-in scenario. The sensor system 28 may sense the longitudinal accelerator and the lateral accelerator of the vehicle using one or more sensing devices 40a-40n, such as one or more gyroscope and/or accelerometers. At block 306, the controller 34 learns the associations between: (a) the absolute distance from the vehicle 10 to the other vehicle OV; direction angle; the actor relative velocity; the actor relative acceleration; and the actor orientation; and (b) the longitudinal and the lateral acceleration of the vehicle 10. After block 306, the controller 34 executes block 308.

At block 308, the controller 34 models the human driver reaction to the traffic situation (i.e., the cut-in scenario or no cut-in scenario), which is an example of block 206 described above. After block 308, the controller 34 executes block 310. At block 310, the controller 34 integrates the model to the control and motion planning algorithms of the vehicle 10. Block 310 is an example of the block 208 described above.

Figure 4:
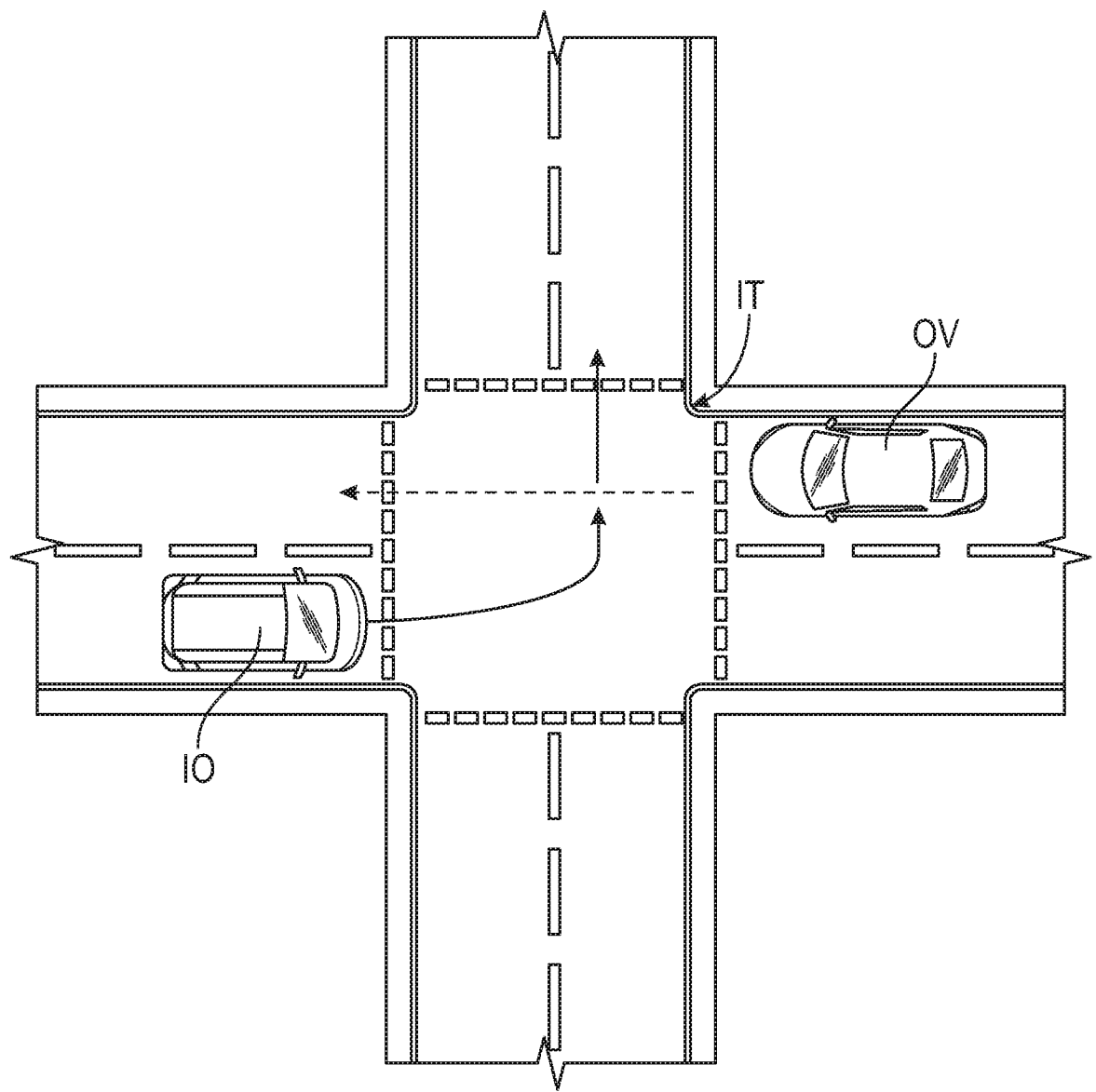
FIG. 4 is a schematic illustration of a left-turn scenario.

FIG. 4 illustrates a left-turn scenario in which the vehicle 10 is turning left at an intersection IT while the other vehicle OV is crossing the intersection. In this left-turn scenario, at block 206 of method 200 (FIG. 2), the controller 34 selects the optimal driving profile. To do so, the sensing system 28 collects data regarding the pleasantness/comfort feedback from a passenger of the vehicle 10 that is turning left. As discussed above, this passenger may have a tablet (which may include a potentiometer) to rate the pleasantness/comfort of the human driving style. In this left-turn scenario, the sensing system 28 senses, among other things, lateral acceleration, longitudinal acceleration, longitudinal jerk, and lateral jerk during the entirety of the left-turn scenario. The controller 34 then receives and stores the sensed information from the sensor system 28 and correlates the sensed information (e.g., lateral acceleration, longitudinal acceleration, lateral jerk, and longitudinal jerk) with the pleasantness/comfort feedback during the entirety of the left-turn scenario. For instance, the controller 34 correlates the sensed information about the driver human profile when the passenger of the vehicle 10 provides the highest possible pleasantness/comfort rating. Then, the controller 34 compares the sensed information regarding the human driving style with the autonomous driving data (e.g., lateral acceleration, longitudinal acceleration, lateral jerk, and longitudinal jerk) when the autonomous vehicle operates in a left-turn scenario using the default control and planning parameters of the control and planning system (i.e., the control system 100) to determine the difference between those parameters (e.g., lateral acceleration, longitudinal acceleration, lateral jerk, and longitudinal jerk). These differences show what aspects need to be changed in order to increase the autonomous vehicle comfort driving style and is translated to executable action at the planning stage of the autonomous vehicle 10.

Figure 5:
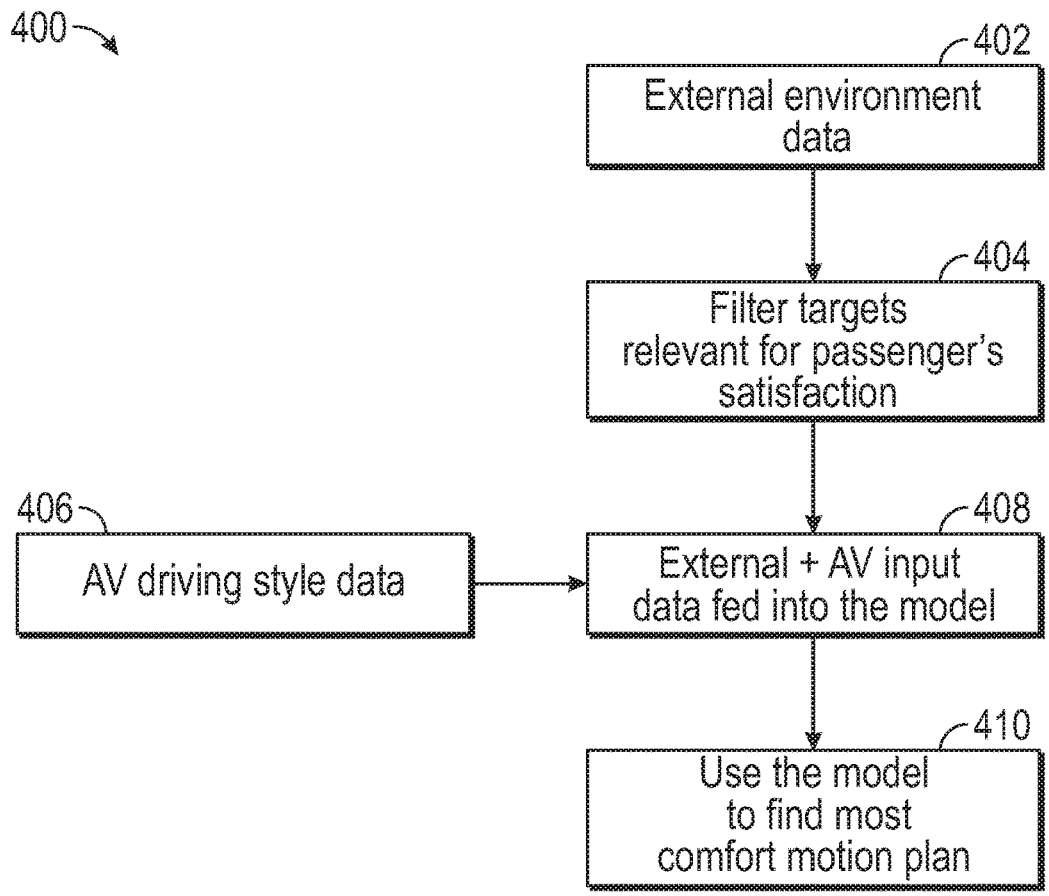
FIG. 5 is a flowchart of a process for using autonomous vehicle and environmental data to select the most comfortable motion plan.

FIG. 5 is a flowchart of a process 400 for using autonomous vehicle and environmental data to select the most comfortable motion plan. The process 400 begins at block 402. At block 402, the sensory system 28 senses external environment data using one or more sensing devices 40a-40n, such as optimal cameras or thermal cameras. The controller 34 receives, collects, and stores the sensed environmental data based on inputs from the sensing system 28. The environmental data may include, but is not limited to, the location and velocity of an object that is external to the vehicle 10, such as another vehicle (i.e., a second or remote vehicle) and/or a pedestrian. Then, the process 400 continues to block 404.

At block 404, the controller 34 filters the data that is relevant for the passenger's satisfaction. This filtering step entails filtering the noise of the relevant data and excluding data that is not relevant to the passenger's satisfaction (i.e., pleasantness/comfort). After filtering the environmental data, the process 400 continues with blocks 406 and 408.

At block 406, the controller 34 receives the default autonomous vehicle driving style data. At block 408, the controller 34 feeds the filtered environmental data and the default autonomous vehicle driving style data to design a model that predicts passenger satisfaction. Then, this model is used, at block 410, to find the most comfortable motion plan for the vehicle 10. A Random Forest Learning technique may be used to find the most comfortable motion plan.

Figure 6:
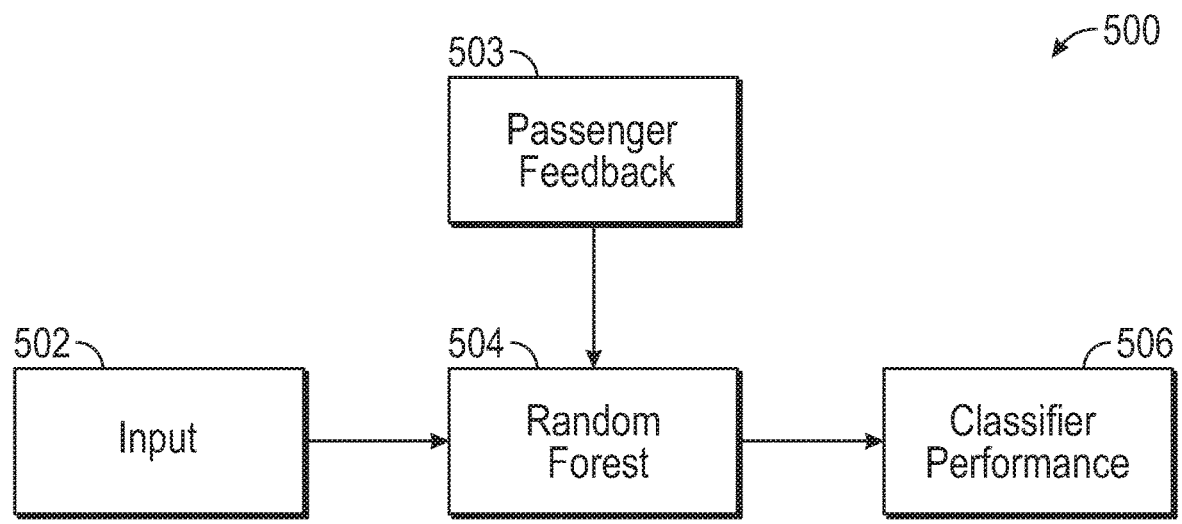
FIG. 6. is a flowchart of a Random Forest modeling technique.

FIG. 6 is a flowchart of a Random Forest modeling technique method 500 for selecting the optimal driving profile (see blocks 204 and 206 of FIG. 2). The method 500 begins at block 502, which entails an input set. In other words, the controller 34 receives input data from, for example, the sensory system 28. The input data includes at least environment data and vehicle dynamics data. The environmental data includes identifying relevant targets and information about the relevant targets. The relevant targets include objects, such as other vehicles OV, that are within a predetermined radius (e.g., distance) from the vehicle 10. Once the relevant targets are identified, the sensory system 28 senses information about the relevant targets, such as whether the relevant target is moving or not moving, the distance from the vehicle 10 to the relevant target, velocity of the relevant target, the vehicle type of the relevant vehicle 10, whether the relevant vehicle has ever moved, the acceleration of the relevant object (e.g., vehicle), whether the hazard vehicle lights are on, and whether the vehicle braking lights are on. At block 502, the controller 34 receives vehicle dynamics data about the vehicle 10, which may include lateral acceleration, lateral jerk, longitudinal acceleration, and longitudinal jerk. After block 502, the method 500 proceeds to block 504, which is an example of the machine learning block 204 of method 200 (FIG. 2). At block 504, the controller 34 executes a Random Forest learning technique to select the optimal driving profile. The Random Forest learning technique creates multiple decision trees relating to passenger discomfort based on passenger feedback about the pleasantness/comfort of human driving styles, which is collected at block 503. At block 504, the controller 34 uses the Random Forest learning technique to identify what leads to discomfort during a drive. For instance, the Random Forest learning technique considers and compares parameters with thresholds. The Random Forest learning techniques compares, for example, the forward acceleration and the longitudinal jerk of the vehicle 10 with respective threshold. Then, the method 500 proceeds to block 506. At block 506, the controller 34 emulates the performances of the classifier (Random Forest output). To do so, the controller 34 may evaluate a receiver operating characteristic curve.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

The invention claimed is:

1. A method for controlling a vehicle, comprising:
collecting data about human driving styles while a human driver drives the vehicle;
machine learning how the human driver reacts to different traffic scenarios based on the collected data to create a plurality of human driving styles profiles;
selecting, via a controller, an optimal driving profile of the plurality of human driving styles profiles, wherein the optimal driving profile is selected based on feedback provided by a passenger of the vehicle, the feedback is indicative of a pleasantness of each of the plurality of human driving styles profiles, and a human driving style profile of the plurality of human driving styles profiles rated with a highest pleasantness by the passenger of the vehicle is selected as the optimal driving profile;
creating a driving plan based on the optimal driving profile;
commanding, via the controller, the vehicle to execute the driving plan in a controlled environment to test the pleasantness of the optimal driving profile;
receiving, by the controller, a pleasantness rating from the passenger of the vehicle while the vehicle executes the driving plan;
comparing the pleasantness rating received from the passenger of the vehicle with a predetermined threshold;
determining that the pleasantness rating received from the passenger of the vehicle is equal to or greater than the predetermined threshold; and
ending the method in response to determining that the pleasantness rating received from the passenger of the vehicle is equal to or greater than the predetermined threshold.

2. The method of claim 1, further comprising:
determining that the pleasantness rating received from the passenger of the vehicle is less than the predetermined threshold; and
in response to determining that the pleasantness rating is less than the predetermined threshold, machine learning again how the human driver reacts to the different traffic scenarios based on the collected data.

3. The method of claim 2, wherein collecting data about human driving styles includes:
collecting variables data, wherein the variables data includes acceleration, road objects location, and road objects behavior.

4. The method of claim 3, wherein the data about human driving styles are recordings relating to day-to-day human driving.

5. The method of claim 4, wherein the machine learning is selected from a group consisting of Deep Reinforcement Learning, Random Forest Learning, and Deep Neural Network Learning.

6. The method of claim 5, wherein selecting the optimal driving profile includes investigating the plurality of human driving styles profiles outputted by the machine learning to select the optimal driving profile.

7. The method for claim 6, further comprising changing a parameter of a control and planning system of the vehicle to implement the driving plan.

8. The method of claim 7, wherein commanding the vehicle to execute the driving plan in the controlled environment includes simulating random sets of traffic situations in the controlled environment, and the controlled environment is a racetrack.

9. The method of claim 1, wherein:
one of the different traffic scenarios is a cut-in scenario;
collecting data about human driving styles while the human driver drives the vehicle includes collecting data about while the human driver drives during the cut-in scenario;
machine learning how the human driver reacts to different traffic scenarios based on the collected data to create the plurality of human driving styles profiles includes machine learning how the human driver reacts in the cut-in scenario; and
in the cut-in scenario:
the vehicle is a first vehicle;
the first vehicle is moving on a first lane;
a second vehicle is moving on a second lane that is immediately adjacent the first lane;
a dividing, dashed line separates the first lane from the second lane; and
the second vehicle moves from the second lane toward the first lane until the second vehicle is moving on the first lane and in front of the first vehicle.

10. The method of claim 9, wherein collecting data about human driving styles while the human driver drives the vehicle includes collecting data about while the human driver drives during the cut-in scenario includes, using a sensor system, sensing:
an absolute distance from the first vehicle to the second vehicle;
a direction angle, wherein the direction angle is an angle of the first vehicle relative to the second vehicle;
an actor relative velocity, wherein the actor relative velocity is a difference in velocity between the first vehicle and the second vehicle;
an actor relative acceleration, wherein the actor relative acceleration is a difference in acceleration between the first vehicle and the second vehicle; and
an actor orientation, wherein the actor orientation is a yaw rate of the first vehicle.

11. The method of claim 10, wherein the controller receives input data from the sensor system that is indicative of absolute distance, the direction angle, the actor relative velocity, the actor relative acceleration, and the actor orientation.

12. The method of claim 11, wherein machine learning how the human driver reacts in the cut-in scenario includes:
sensing, using the sensor system, a lateral acceleration of the first vehicle and a longitudinal acceleration of the vehicle during the cut-in scenario; and
learning associations between: (a) the absolute distance from the first vehicle to the second vehicle; direction angle; the actor relative velocity; the actor relative acceleration; and the actor orientation; and (b) the longitudinal acceleration and the lateral acceleration of the first vehicle.

13. An autonomous vehicle comprising:
a plurality of sensor devices configured to sense observable conditions of an exterior environment of the autonomous vehicle;
a control system in communication with the plurality of sensor devices, wherein the control system is configured to control the autonomous vehicle, the control system includes a controller, and the controller is programmed to:

collect data about human driving styles while a human driver drives the autonomous vehicle;

machine learn how the human driver reacts to different traffic situations based on the collected data to create a plurality of human driving styles profiles;

select an optimal driving profile of the plurality of human driving styles profiles, wherein the optimal driving profile is selected based on input received from a vehicle passenger in which the vehicle passenger provides feedback on a pleasantness of the plurality of human driving styles;

create a driving plan based on the optimal driving profile;

command the autonomous vehicle to execute the driving plan in a controlled environment; and receive a pleasantness rating from the vehicle passenger that rates a pleasantness of the driving plan being executed by the autonomous vehicle;

compare the pleasantness rating received from the vehicle passenger with a predetermined threshold determine that the pleasantness rating received from the vehicle passenger is equal to or greater than the predetermined threshold; and in response to determining that the pleasantness rating received from the vehicle passenger is equal to or greater than the predetermined threshold, no more machine learning is conducted.

14. The autonomous vehicle of claim 13, wherein the controller is configured to:

determine that the pleasantness rating received from the vehicle passenger is less than the predetermined threshold; and in response to determining that the pleasantness rating is less than the predetermined threshold, machine learn again how human drivers react to different road and traffic situations based on the collected data.

15. The autonomous vehicle of claim 14, wherein the controller is configured to:

collect variables data, wherein the variables data includes acceleration, road objects location, and road objects behavior.

16. The autonomous vehicle of claim 15, wherein the collected data about human driving styles are recordings relating to day-to-day human driving.

* * * * *